United States Patent [19]

Her et al.

[11] Patent Number: 5,219,314
[45] Date of Patent: Jun. 15, 1993

[54] FLEXIBLE DRIVING TRANSMITTING COUPLING

[75] Inventors: Kenneth K. Her; Nelson A. Jones, both of Peoria; Kent C. Bates, Chillicothe, all of Ill.

[73] Assignee: Caterpillar Inc., Peoria, Ill.

[21] Appl. No.: 565,078

[22] Filed: Aug. 10, 1990

[51] Int. Cl.$^5$ .............................................. F16D 3/77
[52] U.S. Cl. ........................................ 464/84; 464/98
[58] Field of Search ................... 464/98, 84, 99, 100, 464/101, 82, 147; 192/106.1

[56] References Cited

U.S. PATENT DOCUMENTS

| | | | |
|---|---|---|---|
| 2,281,898 | 5/1942 | Whitten | 192/106.1 |
| 2,556,293 | 6/1951 | Nordt | 464/98 X |
| 2,564,103 | 8/1951 | Gallagher | 464/98 X |
| 2,627,733 | 2/1953 | Amberg | 464/84 |
| 3,183,731 | 5/1965 | Dolza | 464/84 X |
| 3,283,536 | 11/1966 | Fisher | 464/84 |
| 3,371,549 | 3/1968 | Schrempp | 74/411 |
| 3,464,233 | 9/1969 | Brouwers et al. | 464/101 |
| 3,808,837 | 5/1974 | Anderson et al. | 464/99 |
| 3,837,178 | 9/1974 | Hackforth et al. | 464/89 |
| 3,955,377 | 5/1976 | Bendall | 464/7 |
| 4,096,711 | 6/1978 | Carlson et al. | 464/99 |

FOREIGN PATENT DOCUMENTS

| | | | |
|---|---|---|---|
| 0733885 | 7/1955 | United Kingdom | 464/98 |
| 0779357 | 7/1957 | United Kingdom | 464/99 |

*Primary Examiner*—Daniel P. Stodola
*Assistant Examiner*—William G. Battista, Jr.
*Attorney, Agent, or Firm*—Diana L. Charlton

[57] ABSTRACT

A flexible coupling formed from sheet material and having preselected stiffness characteristics is incorporated between an engine output member and an input member of a mechanism to reduce the linear vibration levels of the system in use and to accommodate a preselected amount of misalignment therebetween. The flexible coupling has radially outer and inner edge portions, and a formed intermediate portion connecting them which in cross section has a generally truncated V-shape. A preferred embodiment has an annular body with the intermediate portion thereof having conical outer and inner walls, a relatively flat end wall, and blended corners connecting the walls and edge portions. When used between a diesel engine and an electric generator set the formed flexible coupling shifted the major structural resonances away from the normal operating range and greatly reduced the linear vibration levels thereof.

8 Claims, 3 Drawing Sheets

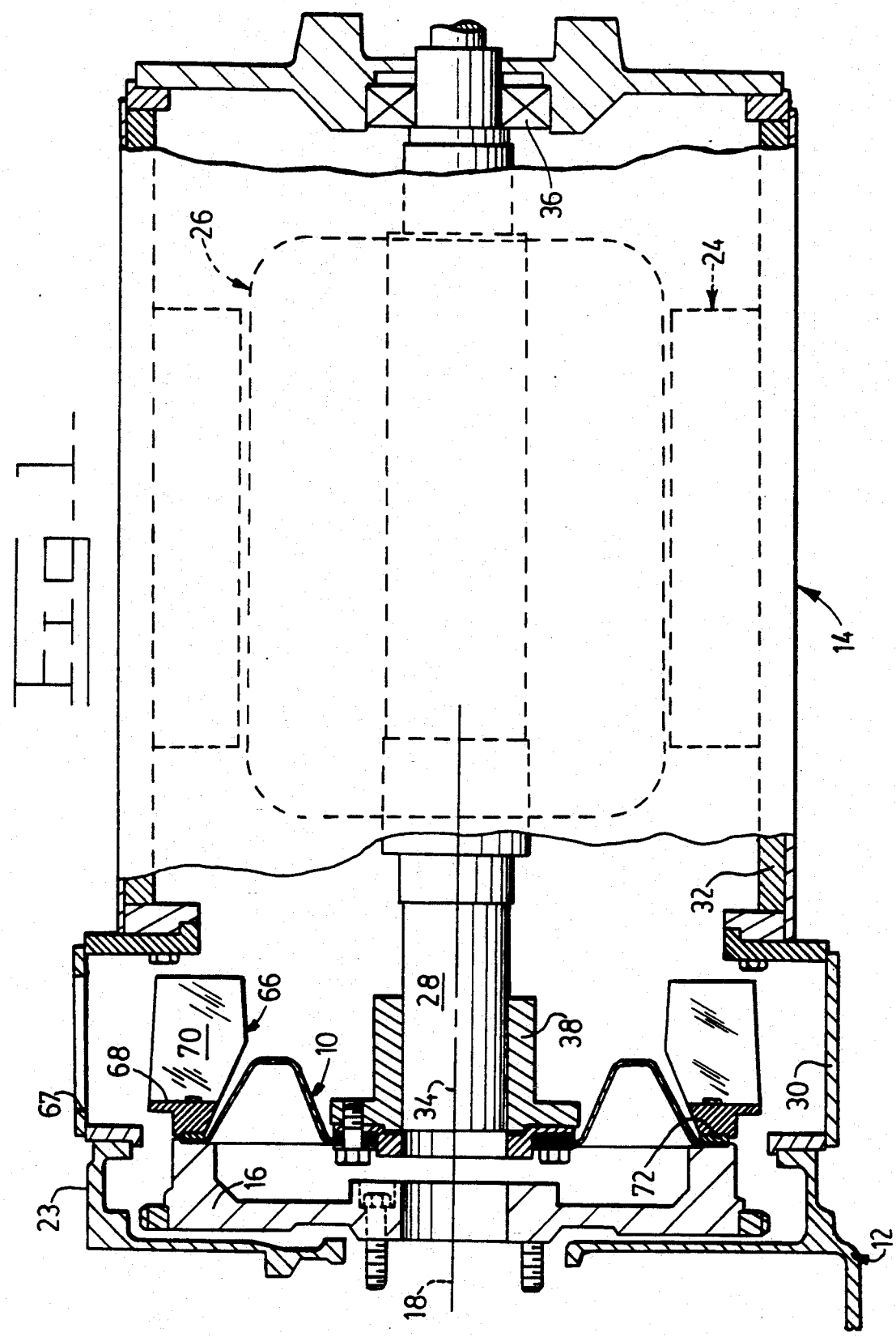

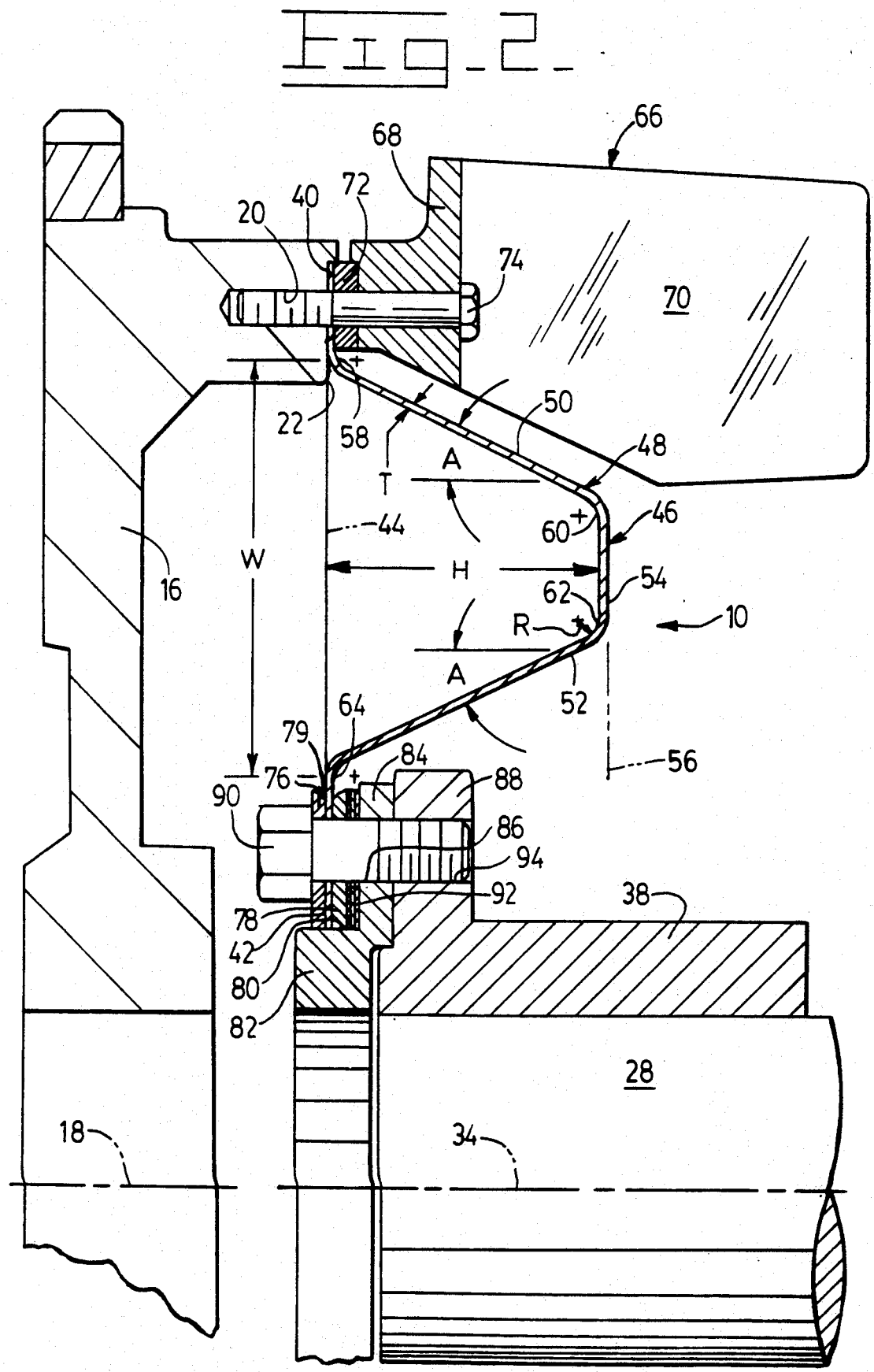
Fig_2

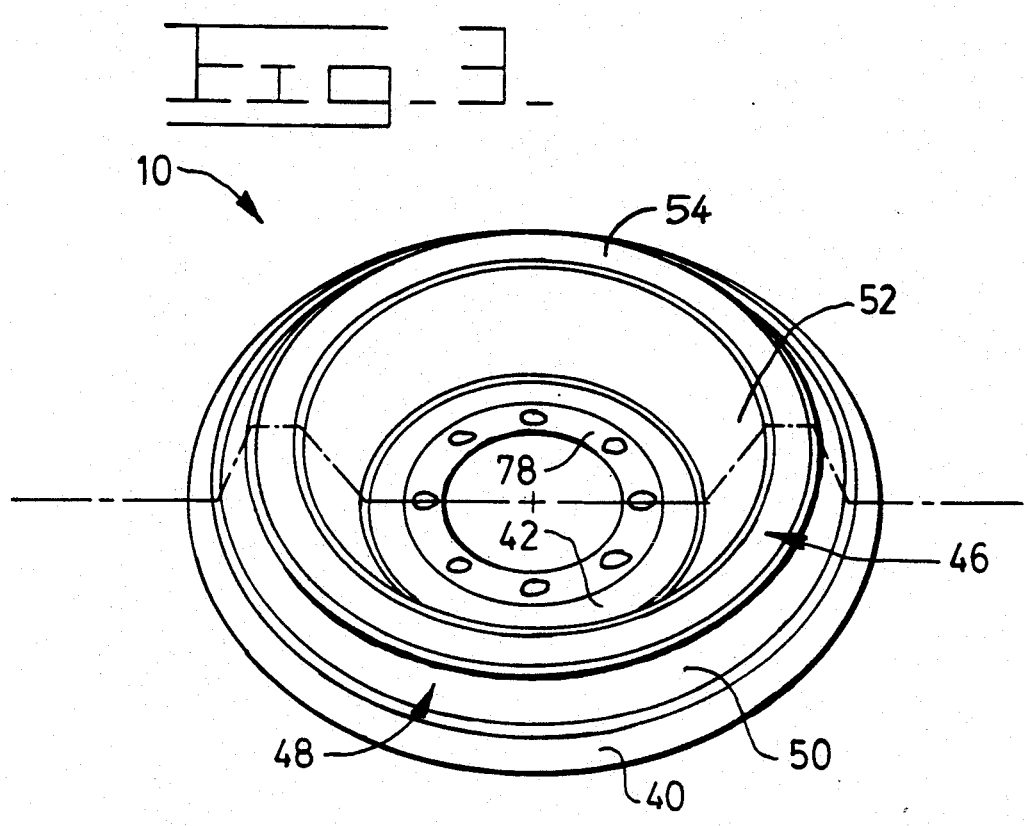
Fig_3_
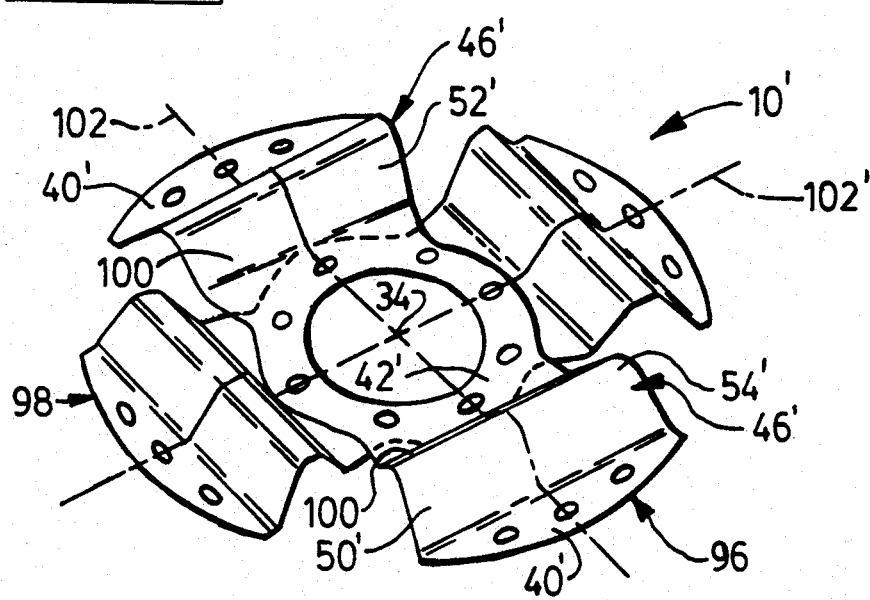
Fig_4_

FLEXIBLE DRIVING TRANSMITTING COUPLING

TECHNICAL FIELD

This invention relates generally to a formed flexible coupling for connecting a driving member to a driven member while accommodating some misalignment therebetween, and more particularly to a flexible drive transmitting coupling having preselected radial stiffness characteristics for shifting the major structural resonances of the system away from the primary operating range.

BACKGROUND ART

U.S. Pat. No. 4,096,711 issued Jun. 27, 1978 to G.A. Carlson, et al. teaches a dual flex plate drive for use between a torque converter and a transmission to reduce torsional vibration levels and to compensate for misalignment. In that drive a plurality of flat annular discs of steel material are stacked together to form a flexible drive plate assembly at each end of a centrally disposed drive tube. A single one of these drive plate assemblies has been used with some success between a diesel engine flywheel and an electric generator set's input drive shaft to reduce the amplitude of linear vibrations of the generator set. However, a single assembly is too stiff radially and has a limited ability to accommodate misalignment between the driving and driven members and, accordingly, drive plate assemblies have been used in tandem to increase the maximum capacity for misalignment. The tandem solution is more costly because it has more piece parts, and it requires considerable axial space.

There are a number of other coupling designs which provide various amounts of flexibility and/or stiffness in the radial and axial directions, and some resistance to bending with the imposition of torsional loads under a relatively limited range of misalignment between the input and output members thereof. Representative of the art in this area are the following U.S. Pat. Nos.:

2,281,898 issued May 5, 1942 to O.M. Whitten.
3,283,536 issued Nov. 8, 1966 to W. Fisher.
3,371,549 issued Mar. 5, 1968 to E. Schrempp.
3,808,837 issued May 7, 1974 to N.J. Anderson et al
3,955,377 issued May 11, 1976 to W.H. Bendall.

For the most part, these couplings are too costly and/or are more difficult to manufacture or assemble in use. They also exhibit deficiencies in continuously transmitting the desired high levels of torque under preselected ranges of radial, axial and bending flexibility without excessive stress levels.

Therefore, what is desired is an economical flexible coupling having a simple and rugged construction, and that requires a relatively limited amount of axial and radial space. For example, it should preferably be all-metallic to eliminate the problems associated with deterioration of elastomeric or rubber elements under the hot and oily environments so typically encountered. Moreover, the coupling must be sufficiently flexible to accept various types of misalignment between the axes of the driving and driven members while simultaneously having the capability to transmit the desired amount of torque, and to have relatively wide ranges of radial and bending flexibility while controlling the resonances of the drive line such that linear vibration of any portion of the total package is reduced to an acceptable level.

The present invention is directed to overcoming one or more of the problems as set forth above.

DISCLOSURE OF THE INVENTION

In one aspect of the invention, a flexible coupling connects a driving member to a driven member generally along a central axis, and has a radially outer edge portion connected to one of the members, a radially inner edge portion connected to the other one of the members, and a formed intermediate portion that flexibly interconnects the edge portions and provides a generally truncated V-shaped section when cut by a cutting plane containing the central axis.

In another aspect of the invention a flexible coupling is provided that includes a generally annular body of sheet material having flat radially outer and inner edge portions connected to the driving and driven members, and a formed intermediate portion including a conical outer wall connected to the outer edge portion, a conical inner wall connected to the inner edge portion, and an end wall interconnecting the conical walls.

The flexible coupling of the present invention is simple and rugged, and is preferably shaped from metallic sheet material so that it avoids the deterioration problems associated with elastomeric elements. Moreover, its precise geometric shape provides the stiffness characteristics required to control the resonances of the system and thereby significantly reduces vibration levels, while not being overstressed under the relatively high torque conditions experienced in use.

BRIEF DESCRIPTION OF THE DRAWINGS

FIG. 1 is a diagrammatic elevational view of the output portion of a diesel engine and an electric generator set arranged in series, with the formed flexible coupling of the present invention disposed therebetween, and with portions of the surrounding housings broken open to show details thereof in cross section;

FIG. 2 is an enlarged portion of FIG. 1 showing the formed flexible coupling and associated elements in cross section above the central axis thereof;

FIG. 3 is an isometric or pictorial view of the formed flexible coupling of FIGS. 1 and 2 and including an internal back-up ring; and FIG. 4 is a pictorial view similar to FIG. 3 illustrating an alternate embodiment of the formed flexible coupling of the present invention.

BEST MODE FOR CARRYING OUT THE INVENTION

Referring to FIG. 1, a flexible drive transmitting coupling 10 constructed in accordance with the present invention is arranged in series between a power plant such as a diesel engine 1.2 and an electric generator set 14 of the usual type. In the instant example only the rear or output portion of the engine is illustrated, which is a Model No. 3508 Diesel Engine produced by Caterpillar Inc. of Peoria, Ill. That engine has eight cylinders, powerably drives a conventional output flywheel member 16 at an output speed of 1800 rpm, and produces with the generator set approximately 900 kilowatts. The flywheel member 16 is supported by the engine in the usual manner for rotation about a first central axis 18, and as shown best in FIG. 2 has defined therein a plurality of rearwardly outwardly opening threaded bores 20 that are arranged around the periphery of a flat rear face 22 of the flywheel member, although only one of the bores is illustrated. As is shown in FIG. 1, the engine also has a flywheel housing 23 that generally encircles the flywheel member.

The electric generator set 14 is of the type known as Century Series Model No. 687 produced by Century Electric Co. of Lexington, Tenn. The generator set has one or more stator coils 24, one or more rotor coils 26 secured to a central shaft 28, and front and rear annular housings 30 and 32 containing them. In this embodiment the generator shaft is supported within the housings for rotation about a second axis 34 by the front formed flexible coupling 10 and by a rear bearing assembly 36, and has a driven hub member 38 fixedly secured to the front end thereof. The first and second axes 18 and 34 are generally colinear, but the flexible coupling 10 can accommodate some misalignment therebetween as will later be explained.

As is shown in FIGS. 2 and 3, the flexible coupling 10 has a flat radially outer edge portion 40 connected to the driving flywheel member 16 and a flat radially inner edge portion 42 connected to the driven hub member 38. The edge portions are preferably arranged to be on a common base plane oriented perpendicular to the axes 18 and 34 as is indicated by the reference number 44. Significantly, the flexible coupling 10 includes a formed intermediate portion 46 of a generally annular trough-like shape for flexibly interconnecting the outer and inner edge portions, and that has a generally truncated V-shaped cross section when cut by a cutting plane passing through the central axis. The edge and intermediate portions are integrally formed on a common body 48 from a metallic sheet material of a relatively uniform thickness "T" as indicated in FIG. 2, for example between approximately 2 mm and 5 mm thick. Preferably, the sheet material is of high strength heat treated steel.

In the first embodiment of FIGS. 1–3 the edge and intermediate portions 40,42 and 46 of the common body 48 generally define a plurality of fully annular surfaces of revolution. Specifically, the intermediate portion 46 is basically characterized or delineated by a generally conical outer wall 50, a generally conical inner wall 52, and a relatively flat end wall 54 arranged in a top plane 56 substantially perpendicular to the axes 18 and 34. A first blended corner 58 connects the outer edge portion 40 to the conical outer wall 50, a second blended corner 60 connects the conical outer wall to the end wall 54, a third blended corner 62 connects the end wall to the conical inner wall 52, and a fourth blended corner 64 connects the conical inner wall to the inner edge portion 42. The internal portion of each of these blended corners is formed by revolving an arc of a circle having a preselected internal radius R about the central axis 34 as can be appreciated by reference to FIG. 2. Preferably, the range of internal radii of these blended corners is selected from the range of from about 5 mm to 20 mm. Moreover, the conical outer and inner walls 50 and 52 are inclined in cross section at a preselected angle A with respect to the central axis of between approximately 20 and 45 degrees. The overall height H of the instant embodiment is preferably within the range of about 45 mm and 110 mm between the outer edge portion 40 and the end wall 54, or between the planes 44 and 56, as is indicated in FIG. 2. Alternatively, the ratio of the radial width W of the base of the cross section of the intermediate portion 46 to the overall height H is preferably selected from within a preselected range of from about 1.3 to 3.0.

In the illustrated embodiment of FIGS. 1 and 2 a fan assembly 66 is mounted on the flywheel member 16 for cooling the generator set 14 by pulling cooling air forwardly through the housing 32 and exhausting the heated air out one or more exit windows 67 defined in the front housing 30. The fan assembly has an annular fan body 68 and a plurality of relatively thin and appropriately angled fan blades 70 integrally extending rearwardly from the body. An adapter ring 72 is seated against the fan body 68, and a plurality of fasteners or bolts 74 extend through the fan body 68, the adapter ring 72, and the outer edge portion 40 of the flexible coupling 10 and are screwthreadably received in the threaded bores 20 of the flywheel member 16.

A pair of back-up rings 76 and 78 clampingly contain the inner edge portion 42 of the flexible coupling 10 therebetween, and each one has a rounded peripheral edge 79 that is a surface of revolution that tapers axially away from the inner edge portion 42 with an increase in the distance away from the central axis 34 to reduce stress concentrations in the inner edge portion as a result of flexure in use. The elements 76, 42 and 78 are contained within an external cylindrical surface 80 of another adapter ring 82. The adapter ring 82 has an annular flange 84 having a plurality of cylindrical bores 86 therethrough, and this flange is abuttingly engaged with a thicker flange 88 integrally formed on the front of the driven hub member 38. A plurality of fasteners or bolts 90, only one of which is shown, extend through the back-up rings 76 and 78, the inner edge portion 42, one or more annular spacer shims 92, and the flange 84, and are screwthreadably received in a corresponding plurality of threaded bores 94 formed in the flange 88 to secure the flexible coupling 10 to the central shaft 28 of the generator set 14.

Alternate Embodiment

A second embodiment flexible drive transmitting coupling 10' is illustrated in FIG. 4, and is distinguished from the first embodiment by being constructed of two separate coupling elements 96 and 98 of a similar geometric shape. The body of the upper coupling element 96 has a fully annular and flat inner edge portion 42', and opposite radially outwardly extending arms 100. Each of these arms has a flat outer edge portion 40' and a formed intermediate portion 46' connecting the inner and outer edge portions. It is to be noted that those elements similar in construction to corresponding elements of the first embodiment are indicated by the same reference numbers with a prime indicator appended thereto.

A central plane 102 passing through the circumferential midpoint of the arms 100 defines a cross section substantially identical to that of the flexible coupling 10. However, the walls or exterior surfaces 50', 52', 54' defined by the intermediate portions 46' of the flexible coupling 10' are not surfaces of revolution about the axis 34 like in the first embodiment, but rather are planar walls or surfaces arranged perpendicular to the central plane 102 because they are easier to manufacture or form in that shape.

The lower coupling element 98 is generally similar to the upper coupling element 96, and is arranged in use with the midplane 102' thereof at a right angle to the midplane 102 of the upper coupling element.

Industrial Applicability

In a first test example of the present invention the flexible coupling 10 had the following design parameters:

Steel sheet material thickness T = 2.1 mm
Overall height H = 50 mm
Conical wall angle A = approx. 45°
Internal radius R of corners = 10 mm
Radial width W = 152 mm $$\text{Radial stiffness} = 2.42 \times 10^7 \frac{mN}{mm}$$

$$\text{Axial stiffness} = 4.87 \times 10^6 \frac{mN}{mm}$$

$$\text{Bending stiffness} = 9.1 \times 10^{10} \frac{mN \cdot mm}{rad}$$

$$\text{Torsional stiffness} = 2.5 \times 10^{13} \frac{mN \cdot mm}{rad}$$

In a second test example the flexible coupling 10 had the following parameters:
Steel sheet material thickness T = 2.1 mm
Overall height H = 100 mm
Conical wall angle A = approx. 25°
Internal radius R of corners = 10 mm
Radial width W = 152 mm $$\text{Radial stiffness} = 1.2 \times 10^7 \frac{mN}{mm}$$

$$\text{Axial stiffness} = 4.1 \times 10^7 \frac{mN}{mm}$$

$$\text{Bending stiffness} = 3 \times 10^{11} \frac{mN \cdot mm}{rad}$$

$$\text{Torsional stiffness} = 2.0 \times 10^{13} \frac{mN \cdot mm}{rad}$$

One prior art drive plate assembly of the type disclosed in U.S. Pat. No. 4,096,711 mentioned above was evaluated using 17 flat steel shims of annular construction, with each shim being 0.8 mm. thick. For simplified comparison purposes, an equivalent analytical baseline model of that drive plate assembly was made based on using a single flat steel shim of 2.1 mm thickness that represents the same bending stiffness of that drive assembly; the calculated stiffnesses of the baseline model were:

$$\text{Radial stiffness} = 1.18 \times 10^9 \frac{mN}{mm}$$

$$\text{Axial stiffness} = 1.5 \times 10^5 \frac{mN}{mm}$$

$$\text{Bending stiffness} = 3.1 \times 10^9 \frac{mN \cdot mm}{rad}$$

$$\text{Torsional stiffness} = 5.4 \times 10^{13} \frac{mN \cdot mm}{rad}$$

From the stiffnesses enumerated above it can be appreciated that the radial stiffness of the flexible coupling 10 is desirably less than 5% of the stiffness of the baseline model single drive plate assembly, while the axial stiffness thereof is from about 30 to 270 times that of the baseline model example. Also, the bending and torsional stiffnesses of the flexible coupling 10 are more than 20 times that of the baseline model example and less than half that of the baseline model example respectively.

The first order of vibration for the diesel engine 12 is approximately 30 hertz at 1800 rpm. At a second order of vibration at 2,010 rpm, it has been found that the rear portion of the generator set 14 experiences relatively large vertical movement at a frequency rate of approximately 67 hertz when the engine 12 and generator set 14 are connected together. But when the flexible coupling 10 was incorporated in series therebetween the major structural resonances were effectively shifted away from the normal operating range so that the cyclic linear displacements of all portions of the engine and generator set were greatly reduced.

The flexible coupling 10 was manufactured from a flat high strength steel sheet material using a spin forming process. The formed material was subsequently heated at approximately 1000° F. and allowed to cool slowly to relax any residual stresses in the coupling. It is contemplated, however, that the flexible coupling can alternatively be made by a die-forming process, which could still require stress relieving.

It is furthermore to be noted that the range of internal radii R, of between approximately 5 mm and 20 mm, is of considerable significance. For if the blended corners 58, 60, 62 and 64 are made too large the blended corners and the entire flexible coupling become too stiff, and if they are made too small they are more difficult to form and the stress concentrations therein increase markedly to the point that the flexible coupling would not be able to have an extended service life in use due to cracking failure at one or more of the blended corners.

In view of the foregoing it can be appreciated that the flexible coupling 10 is economical and relatively easy to produce, and can provide a relatively low rate of radial stiffness and relatively high rates of bending and axial stiffness while accommodating a wide range of torsional loads. And, most significantly, it can effectively reduce the linear vibration levels associated with the engine 12 and generator set 14 by shifting the major structural resonances away from the normal operating range.

Other aspects, objects and advantages of this invention can be obtained from a study of the drawings, the disclosure and the appended claims.

We claim:
1. A flexible coupling for connecting a driving member to a driven member generally along a common central axis of rotation thereof, comprising:
a radially outer flat edge portion connected to one of the members, a radially inner flat edge portion connected to the other one of the members, and a formed intermediate portion flexibly interconnecting the edge portions and having a generally truncated V-shaped cross section when cut by a cutting plane containing the central axis, the intermediate portion including an angled outer wall integrally connected to the outer edge portion, an angled inner wall integrally connected to the inner edge portion, and a planar end wall innerconnected between the angled walls and being parallel to the flat edge portions.

2. The flexible coupling of claim 1 wherein the outer and inner edge portions and the intermediate portion are generally annular and define a plurality of surfaces of revolution on a common integrally formed body, and the inner and outer edge portions are arranged in a common base plane.

3. The flexible coupling of claim 2 wherein the walls are annularly connected to each other and to the edge portions by a plurality of blended corners having a preselected range of internal radii (R) in cross section.

4. The flexible coupling of claim 3 wherein the range is from approximately 5 mm to 20 mm with the internal radii being equal within the range.

5. The flexible coupling of claim 1 wherein the inner and outer walls of the intermediate portion are generally conical.

6. The flexible coupling of claim 1 including first and second coupling elements individually having the radially inner edge portion connected to the other one of the members and radially outwardly extending arms, each of the arms having the radially outer edge portion connected to the one member and the formed intermediate portion defining the generally truncated V-shaped cross section.

7. A flexible coupling for connecting a driving member to a driven member generally along a common central axis of rotation thereof, comprising:

a generally annular body formed from metallic sheet material including relatively flat radially outer and inner edge portions connected to the driving and driven members, and a formed intermediate portion including a generally conical outer wall connected tot he outer edge portions, a generally conical inner wall connected to the inner edge portion, and an end wall interconnecting the conical walls and being parallel to the flat edge portions.

8. A flexible coupling for connecting a driving member to a driven member generally along a common axis thereof, comprising:

first and second coupling elements individually having a radially inner flat edge portion connected to one of the members and opposite radially outwardly extending arms, each of the arms having a radially outer flat edge portion connected to the other one of the members and a formed intermediate portion connected the inner and outer flat edge portions, the formed intermediate portions having a generally truncated V-shaped cross section when cut by a cutting plane containing the central axis and having a planar end wall parallel to the flat edge portions.

* * * * *